(12) United States Patent
Shi et al.

(10) Patent No.: US 12,359,104 B2
(45) Date of Patent: Jul. 15, 2025

(54) HEAT AND HUMIDITY RESISTANT ADHESIVE COMPOSITION

(71) Applicant: Henkel AG & Co. KGaA, Duesseldorf (DE)

(72) Inventors: Zhuming Shi, Shanghai (CN); Cheng Lu, Shanghai (CN); Jinqian Chen, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 365 days.

(21) Appl. No.: 17/360,394

(22) Filed: Jun. 28, 2021

(65) Prior Publication Data

US 2021/0324248 A1    Oct. 21, 2021

Related U.S. Application Data

(63) Continuation of application No. PCT/CN2018/124626, filed on Dec. 28, 2018.

(51) Int. Cl.

| | |
|---|---|
| *C09J 133/10* | (2006.01) |
| *C08G 18/80* | (2006.01) |
| *C08K 5/00* | (2006.01) |
| *C08K 5/09* | (2006.01) |
| *C08K 5/14* | (2006.01) |
| *C09J 133/06* | (2006.01) |
| *C09J 133/08* | (2006.01) |
| *C09J 133/14* | (2006.01) |

(52) U.S. Cl.
CPC .......... *C09J 133/10* (2013.01); *C08G 18/807* (2013.01); *C08K 5/0016* (2013.01); *C08K 5/0025* (2013.01); *C08K 5/09* (2013.01); *C08K 5/14* (2013.01); *C09J 133/066* (2013.01); *C09J 133/08* (2013.01); *C09J 133/14* (2013.01); *B32B 2405/00* (2013.01); *C08G 2170/00* (2013.01); *C08K 5/0041* (2013.01); *C09J 2301/408* (2020.08); *C09J 2409/00* (2013.01); *C09J 2425/00* (2013.01); *C09J 2433/00* (2013.01); *C09J 2453/00* (2013.01); *C09J 2463/00* (2013.01)

(58) Field of Classification Search
None
See application file for complete search history.

(56) References Cited

U.S. PATENT DOCUMENTS

| | | |
|---|---|---|
| 4,524,104 A | 6/1985 | Hagio et al. |
| 4,945,006 A | 7/1990 | Muggee et al. |
| 5,328,947 A | 7/1994 | Taguchi et al. |
| 7,300,996 B2 | 11/2007 | Hoffmann et al. |
| 2021/0139754 A1* | 5/2021 | Ishii ............... C09J 175/14 |

FOREIGN PATENT DOCUMENTS

| | | | |
|---|---|---|---|
| CN | 1564835 A | | 1/2005 |
| CN | 104781358 | | 7/2015 |
| CN | 104955901 | | 9/2015 |
| JP | 2012172094 A | * | 9/2012 |
| JP | 2012224962 | | 11/2012 |
| JP | 2014221873 | | 11/2014 |
| WO | 2014066315 | | 5/2014 |

OTHER PUBLICATIONS

Machine translation of JP-2012172094-A (Year: 2012).*
PCT International Search Report issued in connection with International Patent Application No. PCT/CN2018/124626 Mailed date: Oct. 8, 2019.

* cited by examiner

*Primary Examiner* — Frank D Ducheneaux
(74) *Attorney, Agent, or Firm* — Sun Hee Lehmann

(57) ABSTRACT

This invention relates to a heat and humidity resistant adhesive composition, comprising a first part comprising at least one ethylenically unsaturated monomer; a second part comprising at least one initiator; and at least one blocked isocyanate compound comprised in the first part, the second part and/or a third separate part. The adhesive composition exhibits excellent aging performance under rigorous conditions.

12 Claims, No Drawings

HEAT AND HUMIDITY RESISTANT ADHESIVE COMPOSITION

CROSS-REFERENCE TO RELATED APPLICATIONS

The present application is a continuation of International Application PCT/CN2018/124626, filed Dec. 28, 2018. The entire disclosure of the above application is incorporated herein by reference.

TECHNICAL FIELD

This invention relates to a heat and humidity resistant adhesive composition, comprising a first part comprising at least one ethylenically unsaturated monomer; a second part comprising at least one initiator; and at least one blocked isocyanate compound comprised in the first part, the second part and/or a third separate part. The adhesive composition exhibits excellent aging performance under rigorous conditions.

BACKGROUND OF THE INVENTION

Low surface energy substrates, such as polyvinyl chloride (PVC), polycarbonate (PC), and polyethylene (PE), are often more troublesome to be bonded by adhesives compared with high surface energy substrates because adhesives tend to bead up rather than wet out, reducing the contact area with the surface of the substrates. In particular, under high temperature and high humidity conditions, traditional acrylic based structural adhesive loses bonding strength to low surface energy substrate every fast.

Therefore, there is a need for developing an adhesive composition, which has good aging performance after being applied to low surface energy substrates and stored under rigorous conditions. More desirably, the adhesive composition has low odor and exhibits high bonding strength to both high surface energy and low surface energy substrates.

SUMMARY OF THE INVENTION

The present invention relates to an adhesive composition, comprising:
(a) a first part comprising at least one ethylenically unsaturated monomer; and
(b) a second part comprising at least one initiator;
wherein at least one blocked isocyanate compound is presented in at least one of the first part, the second part or an optional separate third part.

The adhesive composition of the invention exhibits good aging performance after being applied to low surface energy substrates and stored under rigorous conditions.

The present invention also relates to a cured product of the adhesive composition.

The present invention also relates to an article bonded by the adhesive composition.

The present invention also relates to a process of making the adhesive composition comprising steps of:
(a) preparing a first part:
  (i) mixing at least one ethylenically unsaturated monomer and at least one blocked isocyanate compound in a temperature range from 25 to 80° C.;
  (ii) adding at least one styrenic block copolymer, and/or at least one curing promoter, and/or at least one ethylenically unsaturated carboxylic acid, and/or at least one toughener, and/or at least one inhibitor, and/or at least one wax, and/or at least one polyacrylate polymer to the mixture obtained from step (i); and
  (iii) cooling the mixture from step (ii) to room temperature;
(b) preparing a second part:
  (i) mixing at least one hydrogenated styrenic block copolymer, and/or at least one plasticizer, and/or at least one epoxy resin in a temperature range from 25 to 80° C.;
  (ii) cooling the mixture from step (i) to room temperature; and
  (iii) adding at least one initiator, and optionally adding at least one colorant to the cooled mixture from step (ii);
(c) mixing the first part and the second part at a desired ratio.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In the context of this disclosure, a number of terms shall be utilized.

The term "acrylate" refers to both or any one of "acrylate" and "methacrylate".

The term "acrylic" refers to both or any one of "acrylic" and "methacrylic".

The term "optionally substituted univalent hydrocarbon group" refers to an optionally substituted alkyl group, such as methyl, ethyl, propyl, butyl, pentyl, hexyl, isopropyl, tertiary butyl, isobutyl, chloromethyl, 3,3,3-trifluoropropyl and the groups alike; an optionally substituted alkenyl group, such as vinyl, allyl, butenyl, pentenyl, hexenyl and the groups alike; an optionally substituted aralkyl group, such as benzyl, phenethyl, 2-(2,4,6-trimethylphenyl)propyl and the groups alike; or an optionally substituted aryl group, such as phenyl, tolyl, xyxyl and the groups alike.

The term "ethylenically unsaturated" refers to at least a site of unsaturation, which is not aromatic.

The First Part

The first part of the present invention comprises at least one ethylenically unsaturated monomer capable of free radical polymerization. The ethylenically unsaturated monomer preferably contains at least one group having the following general formula:

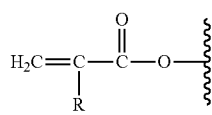

In the formula above, R represents a hydrogen atom, a halogen atom, or an optionally substituted $C_1$ to $C_{10}$ univalent hydrocarbon group. Preferably, R represents a hydrogen atom, a halogen atom, or an optionally substituted $C_1$ to $C_4$ univalent hydrocarbon group. More preferably, R is a hydrogen atom or a methyl group.

Exemplary of the ethylenically unsaturated monomer includes but is not limited to isobornyl acrylate (IBOA), isobornyl methacrylate (IBOMA), cyclohexyl acrylate, cyclohexyl methacrylate, t-butyl acrylate, t-butyl methacrylate, t-butylcyclohexyl acrylate, methyl methacrylate, ethyl methacrylate, propyl methacrylate, phenyl acrylate, phenyl methacrylate, benzyl acrylate, benzyl methacrylate, phenethyl acrylate, phenethyl methacrylate, dicyclopentanyl acrylate, 3,3,5-trimethylcyclohexyl acrylate, 3,3,5-trimethylcyclohexyl methacrylate, dicyclopentenyl acrylate, 1,6-hexanediol diacrylate, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, and isostearyl acrylate. The ethylenically unsaturated monomer can be used alone or in any combination.

Examples of commercially available ethylenically unsaturated monomers are, for example, IBOMA, THFMA (tetrahydrofurfuryl methacrylate), PhEMA (phenoxyethyl methacrylate), IBOA, EHMA (ethylene glycol dimethacrylate) from KPX; TEGDMA (triethylene glycol dimethacrylate) from Satomer; and DHMA (ethylene glycol dimethacrylate) from BASF.

In some embodiments of the present invention, the amount of the ethylenically unsaturated monomer in the first part is preferably from 20 to 90%, more preferably from 30 to 80%, and even more preferably from 55 to 70% by weight based on the total weight of the first part.

In some embodiments of the present invention, the adhesive composition preferably contains from 0 to 5%, more preferably from 0 to 0.5%, even more preferably from 0 to 0.05%, and most preferably 0% of methyl methacrylate (MMA) by weight of the first part in order to reduce the irritating odor of the adhesive composition. It is surprisingly found that even when there is essentially no MMA incorporated, the shear strength of the adhesive composition is still high to both high surface energy substrates and low surface energy substrates, and the aging performance of the adhesive composition is good as well.

In some embodiments of the present invention, the ethylenically unsaturated monomer preferably does not comprise any functional group containing active hydrogen, such as hydroxyl group, carboxyl group and amine group. Without wishing to be bound by any theory, by reacting with the isocyanate group that will be regenerated from the blocked isocyanate compound comprised in the adhesive composition, active hydrogen containing in the ethylenically unsaturated monomer will have negative impact on the humidity resistant performance of the adhesive composition.

The Second Part

The second part of the present invention comprises at least one initiator. The initiator of the present invention may be selected from a peroxide initiator, such as acetyl peroxide, dicumyl peroxide (DCP), 2,5-dimethyl-2,5-bis(t-butylperoxy)-hexyne (DBPH), benzoyl peroxide (BPO), bis(2,4-dichlorobenzoyl)peroxide (DCBP), tert-butyl peroxypivalate (BPP), dicyclohexyl peroxydicarbonate (DCPD), potassium persulfate (KSP), ammonium persulfate (ASP), and the like; an azo-compound initiator, such as 2,2'-azo-bis(4-methoxy-2,4-dimethylvaleronitrile), 2,2'-azo-bis-isobutyronitrile, azobisisoheptonitrile, and the like; and a persulfate initiator, such as potassium persulfate, sodium persulfate, ammonium persulfate, and the like. The initiators can be used alone or in any combination. Preferably, a peroxide initiator is used.

Examples of commercially available initiator, for example, are BPO from Sinopharm; and VAZO 52, VAZO 67 from DuPont Chemical.

In some embodiments of the present invention, the amount of the initiator is preferably from 5 to 70%, and more preferably from 10 to 40% by weight based on the total weight of the second part.

Blocked Isocyanate Compound

Blocked isocyanate compound is presented in at least one of the first part, the second part or an optional separate third part. The blocked isocyanate compound of the present invention comprises at least one isocyanate group blocked by a blocking agent. Examples of the blocking agent include but are not limited to an alcohol compound, such as methanol, ethanol, 2-propanol, n-butanol, sec-butanol, 2-ethyl-1-hexanol, 2-methoxyethanol, 2-ethoxyethanol, 2-butoxyethanol and the like; a phenol compound, such as phenol, cresol, ethylphenol, n-propylphenol, isopropylphenol, n-butylphenol, s-butylphenol, t-butylphenol, and the like; an active methylene compound, such as dimethyl malonate, diethyl malonate, methyl acetoacetate, ethyl acetoacetate, dibenzyl malonate, diphenyl malonate and the like; an amine compound, such as diphenylamine, aniline, carbazole, di-n-propylamine, diisopropylamine, isopropylethylamine and the like; an imine compound, such as polyethylene-imine, ethyleneimine, guanidine and the like; an oxime compound, such as formaldoxime, acetaldoxime, acetoxime, methyl ethyl ketoxime, cyclohexanone oxime, benzophenone oxime and the like; a urea compound, such as urea, thiourea, ethylene urea and the like; an acid imide compound, such as succinic acid imide, maleic acid imide and the like; a triazole compound, such as 1,2,4-triazole, benzotriazole and the like; a pyrazole compound, such as pyrazole, 3,5-dimethylpyrazole, 3,5-diisopropylpyrazole, 3,5-diphenylpyrazole, 3,5-ditbutylpyrazole, 3-methylpyrazole, 4-benzyl-3,5-dimethylpyrazole, 4-nitro-3,5-dimethylpyrazole and the like; a mercaptan compound, such as butylmercaptan, dodecylmercaptan and the like; and an imidazole compound, such as imidazole, 2-methylimidazole and the like. The blocking agent can be used alone or in combination. Preferably the blocking agent is selected from a pyrazole compound, a triazole compound, an oxime compound, a phenol compound, an active methylene compound, or an amine compound. More preferably, the blocking agent is a pyrazole compound.

The blocked isocyanate of the present invention may be prepared by reacting isocyanate compound with above-described blocking agent at atmospheric pressure, under an inert gas atmosphere, and under a reaction temperature from 0 to 150° C., and preferably from 50 to 120° C.

In some embodiments of the present invention, the de-blocking temperature of at least one blocked isocyanate compound in the adhesive composition is preferably from 80 to 200° C., more preferably from 100 to 160° C., and even more preferably from 120 to 140° C. Without wishing to be bound by any theory, when the de-blocking temperature is too high, the isocyanate group in the blocked isocyanate compound is hard to be regenerated and react with water in the environment at the desired temperature. When the de-blocking temperature is too low, the isocyanate group in the blocked isocyanate compound is regenerated too easily and is consumed fast by water in the environment. Therefore, when the de-blocking temperature of the blocked isocyanate is too high or too low, the aging performance of the adhesive composition is deteriorated.

The de-blocking temperature of the blocking agent can be measured by applying the blocked isocyanate compound onto a silicon wafer, and while heating, observing the temperature at which the isocyanate group regenerates by IR measurement.

Examples of commercially available blocked isocyanate compound, for example, are Karenz MOI-BP and AOI-BP from Showa Denko K.K.; and BI-7982, BI-7991, BI-7992 from Baxenden Chemicals.

In some embodiments of the present invention, the blocked isocyanate compound is preferably presented in the first part of the adhesive composition. The amount of the blocked isocyanate compound in the first part is preferably from 0.05 to 10%, and more preferably from 0.5 to 5%. In further embodiments, if the shear strength of the adhesive composition to low surface energy substrate after the cured adhesive composition is stored under rigorous condition is more concerned, it is even more preferably that the amount of the blocked isocyanate compound in the first part is from 1 to 3% by weight based on the total weight of the first part. If the shear strength stability of the adhesive composition to low surface energy substrate after the cured adhesive composition is stored under rigorous condition is more concerned, it is even more preferably that the amount of the blocked isocyanate compound in the first part is from 3 to 5% by weight based on the total weight of the first part.

Optional Additive

The adhesive composition of the present invention may comprise optional additives which may be disposed in one of the first part, the second part and/or an optional separate third part. The selection of suitable additives for the adhesive composition of the invention depends on the specific intended use of the adhesive composition and can be determined in the individual case by those skilled in the art.

Styrenic Block Copolymer

Styrenic block copolymer may be presented in the adhesive composition as an optional additive. The styrenic block copolymer may be prepared by the copolymerization of an aromatic hydrocarbon compound having a vinyl group with an olefin having at least two ethylenic unsaturations. Preferably, the styrenic block copolymer is prepared by the copolymerization of a styrene with a conjugated diene compound, such as 1,3-butadiene, 2-methyl-1,3-butadiene (or isoprene), 2,3-dimethyl-1,3-butadiene, 1,3-pentadiene, 1,3-hexadiene and the like. Exemplary of the styrenic block copolymer includes but is not limited to a styrene-butadiene (SBS) block copolymer, a styrene-isoprene (SIS) block copolymer or a partially hydrogenated product of SBS or SIS with at least one ethylenic unsaturation. The styrenic block copolymer can be used alone or in any combination. It is surprisingly found that the styrenic block copolymer is able to enhance the adhesion strength of the adhesive composition to both high surface energy substrates and low surface energy substrates.

Examples of commercially available styrenic block copolymers are, for example, SBS 0243, SBS 1155, SBS 1116 from Kraton.

In some embodiments of the present invention, at least one styrenic block copolymer is preferably presented in the first part of the adhesive composition. The amount of the styrenic block copolymer in the first part is preferably from 0 to 45%, and more preferably from 20 to 30% by weight based on the total weight of the first part.

Curing Promoter

Curing promoter may be presented in the adhesive composition as an optional additive. The curing promoter may be selected from amines, such as methyldiethanolamine, triethanolamine, diethylaminopropylamine, benzyldimethyl amine, N,N-dimethyl-p-toluidine (DMPT), dihydroxyethyl-p-toluidine (HEPT) and the like; imidazoles, such as 1-methylimidazole, 2-methylimidazole, 2,4-diethylimidazole and the like; polyamines, such as trimethylhexamethylenediamine, 2-methylpentanediamine, and the like; phosphorus compounds, such as triphenyl phosphine (TPP), tri(2,6-dimethoxyphenyl)phosphine, tri(para-tolyl)-phosphine, triphenyl phosphite and the like; and organometallic compounds, such as copper octanoate, copper 2-ethylhexanoate, copper acetylacetonate, cobalt naphthenate, cobalt octanoate, cobalt 2-ethylhexanoate, cobalt acetylacetonate, cobalt isooctanoate, nickel octanoate, nickel 2-ethylhexanoate, nickel acetylacetonate, and the like. The curing promoters can be used alone or in any combination.

Examples of commercially available curing promoters are, for example, TPP, DMPT, HEPT, and cobalt isooctanoate from Sinopharm.

In some embodiments of the present invention, at least one curing promoter is preferably presented in the first part of the adhesive composition. The amount of the curing promoter in the first part is from preferably 0 to 10%, more preferably from 1 to 5%, and even more preferably from 1 to 3% by weight based on the total weight of the first part.

Ethylenically Unsaturated Carboxylic Acid

Ethylenically unsaturated carboxylic acid may be presented in the adhesive composition as an optional additive. Preferably, the ethylenically unsaturated carboxylic acid is in the form of (meth)acrylate-termination. Exemplary of the ethylenically unsaturated carboxylic acid includes but is not limited to acrylic acid, male acid, itaconic acid, crotonoic acid, fumaric acid. The ethylenically unsaturated carboxylic acid of the present invention can be used alone or in any combination.

Example of commercially available ethylenically unsaturated carboxylic acid is, for example, methacrylic acid (MAA) from Sinopharm.

In some embodiments of the present invention, at least one ethylenically unsaturated carboxylic acid is preferably presented in the first part of the adhesive composition. The amount of the ethylenically unsaturated carboxylic acid in the first part is preferably from 0 to 10%, more preferably from 0.5 to 2.5%, and even more preferably from 1 to 1.5% by weight based on the total weight of the first part.

Polyacrylate Polymer

Polyacrylate polymer may be presented in the adhesive composition as an optional additive. The polyacrylate polymer includes both salts and esters of polyacrylic acid. Exemplary of the polyacrylate polymer includes but is not limited to poly(methyl methacrylate), poly(ethyl methacrylate) and sodium polyacrylate. It is surprisingly found that polyacrylate polymer functions to improve the aging performance of the adhesive composition to low surface energy substrates after the cured adhesive composition is stored under rigorous conditions.

Examples of commercially available polyacrylate polymer are, for example, Elvacite acrylic resin 2021 (poly(methyl methacrylate)) and 2595 (modified poly(methyl methacrylate) from Lucite International; and BR113 (polyacrylate) from Dianal America.

In some embodiments of the present invention, at least one polyacrylate polymer is preferably presented in the first part of the adhesive composition. The amount of the polyacrylate polymer in the first part is from 0 to 10%, and preferably from 4 to 9% by weight based on the total weight of the first part.

Toughener

Toughener may be presented in the adhesive composition as an optional additive. The toughener may be selected from vinyl-terminated polybutadiene and core-shell rubber. The toughener can be used alone or in any combination.

The vinyl-terminated polybutadienes preferably have a glass transition temperature below 0° C. The vinyl-termination may be in the form of (meth)acrylate-termination. Exemplary of the vinyl-terminated polybutadiene includes but is not limited to (meth)acrylate-terminated polybutadiene-acrylonitrile copolymers and (meth)acrylate-terminated polybutadiene.

Examples of commercially available vinyl-terminated polybutadienes are, for example, Hypro VTBN from Emerald Performance Polymers; and VTB from Cray Valley.

The core shell rubber of the present invention refers to any common core shell rubber known in the art. Typically, the core shell rubber has a core comprised of a polymeric material having rubbery properties, and a shell grafted onto the core or crosslinked to the core. The core of the core shell rubber may be selected from an acrylic rubber, a silicone rubber and a diene rubber. The shell of the core shell rubber may be selected from an acrylic polymer, an acrylic copolymer, a styrenic polymer, and a styrenic copolymer. Exemplary of the core shell rubber includes but is not limited to acrylonitrile-butadiene-styrene (ABS), methacrylate-butadiene-styrene (MBS), and methacrylate-acrylonitrile-butadiene-styrene (MABS).

Examples of commercially available core shell rubbers are, for example, MBS-TX100 from Arkema; MBS2670 from Dow; and ABS 338 from GE.

In some embodiments of the present invention, at least one toughener is preferably presented in the first part of the adhesive composition. The amount of the toughener in the first part is preferably from 0 to 40%, more preferably from 5 to 30%, and even more preferably from 5 to 10% by weight based on the total weight of the first part.

Inhibitor

Inhibitor may be presented in the adhesive composition as an optional additive. The inhibitor of the present invention may be any common acid polymerization inhibitor and free radical inhibitor known in the art. Exemplary of the inhibitor includes but is not limited to sulfur dioxide, glacial acetic acid, hydroquinone, 2-methylhydroquinone, 2-t-butylhydroquinone, t-butyl catechol, butylated hydroxy toluene, 4-methoxyphenol, 2,6-di-tertbutylphenol, and the like. The inhibitors can be used alone or in any combination.

Example of commercially available inhibitor is, for example, BHT from Sinopharm.

In some embodiments of the present invention, at least one the inhibitor is preferably presented in the first part of the adhesive composition. The amount of the inhibitor in the first part is preferably from 0 to 5%, more preferably from 0.05 to 3%, and even more preferably from 0.1 to 0.2% by weight based on the total weight of the first part.

Wax

Wax may be presented in the adhesive composition as an optional additive. The wax of the present invention may be any common wax known in the art. Exemplary of the wax includes but is not limited to paraffin waxes, microcrystalline waxes, polyethylene waxes, polypropylene waxes, Fischer-Tropsch waxes, oxidized Fischer-Tropsch waxes and functionalized waxes and fatty amide waxes. The waxes can be used alone or in any combination.

Examples of commercially available waxes are, for example, Sasaolwax H1 from Sasol Wax; AC-400 from Honeywell; MC-400 from Marcus Oil Company; Epolene C-18 from Eastman Chemical; Wax 58# from Sinopharm; and AC-575P from Honeywell.

In some embodiments of the present invention, at least one wax is preferably presented in the first part of the adhesive composition. The amount of the wax in the first part is preferably from 0 to 5%, more preferably from 0.05 to 1%, and even more preferably from 0.1 to 0.5% by weight based on the total weight of the first part.

Epoxy Resin

Epoxy resin may be presented in the adhesive composition as an optional additive. The epoxy resin of the present invention refers to any common epoxy resin known in the art and contains at least one epoxy group per molecule. Exemplary of the epoxy resin includes but is not limited to bisphenol A epoxy resins, bisphenol F epoxy resins, biphenyl epoxy resins, naphthalene epoxy resins, diphenyl ether epoxy resins, diphenyl thioether epoxy resins, hydroquinone epoxy resins, biphenyl novolac epoxy resins, cresol novolac epoxy resins, phenol novolac epoxy resins, bisphenol A novolac epoxy resins, trisphenol epoxy resins, tetraphenylolethane epoxy resins, and the like. The epoxy resin can be used alone or in any combination.

Examples of commercially available epoxy resin are, for example, D.E.R. 331 from Olin Corporation; Epoxy 828 from Hexion Specialty Chemicals GmbH; and EPICLON N-665 from Dainippon Ink and Chemicals Inc.

In some embodiments of the present invention, at least one epoxy resin is preferably presented in the second part of the adhesive composition. The amount of the epoxy resin is preferably from 0 to 50%, more preferably from 10 to 50%, and even more preferably from 15 to 30% by weight based on the total weight of the second part.

Plasticizer

Plasticizer may be presented in the adhesive composition as an optional additive. The plasticizer of the present invention refers to any common plasticizer known in the art. Exemplary of the plasticizer includes but is not limited to phosphate esters, aliphatic esters, aromatic esters, dioctyl terephthalate (DOTP), dioctyl phthalate (DOP), di(isononyl) phthalate (DINP), di(isodecyl)phthalate (DIDP), diundecyl phthalate (DUP), dioctyl Adipate (DOA), diisononyl adipate (DINA), trioctyl trimellitate (TOTM), trioctyl phosphate (TOP), tricresyl phosphate (TCP) and the like. The plasticizers can be used alone or in any combination.

Examples of commercially available plasticizer are, for example, DOTP from Sinopharm; and DOA from Wengiang Chemical.

In some embodiments of the present invention, at least one plasticizer is preferably presented in the second part of the adhesive composition. The amount of the plasticizer in the second part is preferably from 0 to 40%, and more preferably from 15 to 30% by weight based on the total weight of the second part.

Hydrogenated Styrenic Block Copolymer

Hydrogenated styrenic block copolymer may be presented in the adhesive composition as an optional additive. The hydrogenated styrenic block copolymer of the present invention may be prepared by hydrogenation of a styrenic block copolymer. Exemplary of the hydrogenated styrenic block copolymer includes but is not limited to a styrene-ethylene-butylene-styrene (SEBS) block copolymer, a styrene-ethylene-propylene-styrene (SEPS) block copolymer, or a styrene-ethylene-ethylene/propylene-styrene (SEEPS) block copolymer. The hydrogenated styrenic block copolymers can be used alone or in any combination.

Commercially available hydrogenated styrenic block copolymer is, for example, MD 1652 from Kraton.

In some embodiments of the present invention, hydrogenated styrenic block copolymer is preferably presented in the second part of the adhesive composition. The amount of the hydrogenated styrenic block copolymer in the second part is preferably from 0 to 40%, and more preferably from 10 to 30% by weight based on the total weight of the second part.

Other optional additives that may be used in the adhesive composition of the present invention, include but are not limited to antioxidants; reinforcers; fillers; propellants; biocides; dyes; pigments; thickeners; solvents; reactive diluents; and the mixtures thereof.

In a preferred embodiment, the adhesive composition comprises:
(a) a first part comprising:
  (i) from 20 to 90% by weight of the first part of at least one ethylenically unsaturated monomer;
  (ii) from 0.05 to 10% by weight of the first part of at least one blocked isocyanate compound;
  (iii) from 0 to 45% by weight of the first part of at least one styrenic block copolymer;
  (iv) from 0 to 10% by weight of the first part of at least one curing promoter;
  (v) from 0 to 10% by weight of the first part of at least one ethylenically unsaturated carboxylic acid;
  (vi) from 0 to 40% by weight of the first part of at least one toughener;
  (vii) from 0 to 5% by weight of the first part of at least one inhibitor;
  (viii) from 0 to 5% by weight of the first part of at least one wax; and
  (ix) from 0 to 10% by weight of the first part of at least one polyacrylate polymer; wherein the weight percentages of all components in the first part add up to 100%;
(b) a second part comprising:
  (i) from 5 to 70% by weight of the second part of at least one initiator;
  (ii) from 0 to 50% by weight of the second part of at least one epoxy resin;
  (iii) from 0 to 40% by weight of the second part of at least one plasticizer;
  (iv) from 0 to 40% by weight of the second part of at least one hydrogenated styrenic block copolymer; and
  (v) from 0 to 1% by weight of the second part of at least one colorant;
wherein the weight percentages of all components in the second part add up to 100%.

The adhesive composition of the present invention may be prepared by the steps of:
(a) preparing a first part:
  (i) mixing at least one ethylenically unsaturated monomer and at least one blocked isocyanate compound in a temperature range from 25 to 80° C.; and
  (ii) cooling the mixture from step (i) to room temperature;
(b) preparing a second part:
  (i) obtaining at least one initiator;
(c) mixing the first part and the second part at a desired ratio.

The adhesive composition of the present invention is preferably prepared by the steps of:
(a) preparing a first part:
  (i) mixing at least one ethylenically unsaturated monomer and at least one blocked isocyanate compound in a temperature range from 25 to 80° C.;
  (ii) adding at least one styrenic block copolymer, and/or at least one curing promoter, and/or at least one ethylenically unsaturated carboxylic acid, and/or at least one toughener, and/or at least one inhibitor, and/or at least one wax, and/or at least one polyacrylate polymer to the mixture obtained from step (i); and
  (iii) cooling the mixture from step (ii) to room temperature;
(b) preparing a second part:
  (i) mixing at least one hydrogenated styrenic block copolymer, and/or at least one plasticizer, and/or at least one epoxy resin in a temperature range from 25 to 80° C.;
  (ii) cooling the mixture from step (i) to room temperature; and
  (iii) adding at least one initiator, and optionally adding at least one colorant to the cooled mixture from step (ii);
(c) mixing the first part and the second part at a desired ratio.

The first part should be used in a weight ratio to the second part, in the range of 20:1 to 1:1, and preferably from 10:1 to 5:1. A person skilled in the art will be able to make appropriate choices among the varies components based on the description, representative examples and guidelines of the present invention to prepare a composition to achieve desired effects.

The first part and the second part should be combined 0 to 5 minutes prior to the use of the adhesive composition for substrate bonding.

The adhesive composition of the present invention may be cured in a temperature range from −10 to 40° C. and applied to substrates by a mixing gun.

The shear strength of the adhesive composition of the present invention to high surface energy substrate ($T_{high}$) may be assessed according to ASTM1002.

The adhesive composition of the present invention preferably has a shear strength greater than or equal to 14 Mpa after being applied to high surface energy substrate, such as aluminum, and cured under the condition of 23° C. and 50% RH for 1 day.

The shear strength of the adhesive composition of the present invention to low surface energy substrate ($T_{low}$) may be assessed according to ASTM1002.

The adhesive composition of the present invention preferably has a shear strength greater than or equal to 8 Mpa, and more preferably greater than or equal to 11 Mpa after being applied to low surface energy substrate, such as PC, and cured under the condition of 23° C. and 50% RH for 1 day.

The shear strength of the adhesive composition of the present invention to low surface energy substrate after the cured adhesive composition is stored under rigorous condition ($T_r$) may be assessed according to ASTM1002.

The adhesive composition of the present invention preferably has a shear strength greater than or equal to 6 Mpa, and more preferably greater than or equal to 9 Mpa after being applied to low surface energy substrate, such as PC, cured under the condition of 23° C. and 50% RH for 1 day, and stored under the condition of 65° C. and 95% RH for 7 days.

A decrease ratio in shear strength of the adhesive composition ($R_d$) after the cured adhesive composition is stored under rigorous conditions is calculated by the following formula:

$$R_d = (T_{low} - T_r)/T_{low}$$

The adhesive composition of the present invention preferably has a decrease ratio in shear strength less than or equal to 0.4, more preferably less than or equal to 0.2, and even more preferably less than or equal to 0.1.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Test Methods

Shear Strength to High Surface Energy Substrate

The shear strength of the adhesive composition was determined according to ASTM1002 after the adhesive composition was applied to bond the aluminium substrates (AnAl (6061) available from Dongguan Baiside plastic co., Ltd.) and was cured under the condition of 23° C. and 50% RH for 1 day.

Shear Strength to Low Surface Energy Substrate

The shear strength of the adhesive composition was determined according to ASTM1002 after the adhesive composition was applied to bond the PC substrates (available from Dongguan Baiside plastic co., Ltd.) and was cured under the condition of 23° C. and 50% RH for 1 day.

Shear Strength to Low Surface Energy Substrate after the Cured Adhesive Composition is Stored Under Rigorous Condition The adhesive composition was applied to bond the PC substrates (available from Dongguan Baiside plastic co., Ltd.), cured under the condition of 23° C. and 50% RH for 1 day, and stored under the condition of 65° C. and 95% RH for 7 days. The shear strength of cured adhesive composition to PC substrate was then determined according to ASTM1002.

Shear Strength Stability after the Cured Adhesive Composition is Stored Under Rigorous Condition The decrease ratio in shear strength of the adhesive composition ($R_d$) after the cured adhesive composition was stored under rigorous conditions is calculated by the following formula:

$$R_d = (T_{low} - T_r)/T_{low}$$

Example 1-7

A first part of the adhesive composition sample was prepared according to Table 1. THFMA, DHMA, IBOMA were firstly well mixed with AOI-BP or MOI-BP or A01 at 50° C. The rest of the components were added to the mixture with continuous stirring to form the first part. Then the first part was cooled down to room temperature.

A second part of the adhesive composition sample was prepared according to Table 2. MD 1652, Epoxy 828, and DON DOTP were firstly mixed together at 80° C. for 5 hours, and the mixture was cooled down to room temperature. BPO and Ultramarine blue colorant were further added to the mixture with stirring to from the second part.

The first part and the second part of the adhesive composition sample were mixed in a weight ratio of 10:1 and were filled into a syringe one minutes before being applied to the substrates. The adhesive composition sample was cured under the condition of 23° C. and 50% RH for 1 day, and then subjected to various of tests mentioned above.

TABLE 1

First part of the adhesive composition

| | Weight (%) | | | | | | |
|---|---|---|---|---|---|---|---|
| Components | Example 1 | Example 2 | Example 3 | Example 4 | Example 5 | Example 6 | Example 7 |
| THFMA[1] | 32.7 | 32.7 | 32.3 | 32.4 | 31.7 | 32.7 | 32.8 |
| DHMA [2] | 2.4 | 2.4 | 2.4 | 2.4 | 2.3 | 2.4 | 2.4 |
| IBOMA [3] | 27.9 | 27.9 | 27.7 | 27.4 | 26.9 | 27.8 | 28 |
| SBS 0243[4] | 16.9 | 16.9 | 16.8 | 16.7 | 16.3 | 16.9 | 17 |
| BR113[5] | 8 | 8 | 7.9 | 7.8 | 7.7 | 8 | 8 |
| MAA[6] | 2.1 | 2.1 | 2.1 | 2 | 2 | 2.1 | 2.1 |
| MBS2670[7] | 3.4 | 3.4 | 3.4 | 3.3 | 3.3 | 3.4 | 3.4 |
| VTB[8] | 3.5 | 3.5 | 3.5 | 3.4 | 3.4 | 3.5 | 3.5 |
| TPP[9] | 0.2 | 0.2 | 0.2 | 0.2 | 0.2 | 0.2 | 0.2 |
| DMPT[10] | 1.9 | 1.9 | 1.9 | 1.8 | 1.8 | 1.9 | 1.9 |
| BHT[11] | 0.1 | 0.1 | 0.1 | 0.1 | 0.1 | 0.2 | 0.2 |
| AOI-BP[12] | 0.4 | | 1.2 | 2 | 3.8 | | |
| MOI-BP[13] | | 0.4 | | | | | |
| AOI[14] | | | | | | 0.4 | |
| Wax[15] | 0.5 | 0.5 | 0.5 | 0.5 | 0.5 | 0.5 | 0.5 |

[1]THFMA (Tetrahydrofurfuryl methacrylate, from KPX);
[2] DHMA (Ethylene glycol dimethacrylate, from BASF);
[3] IBOMA (Isobornyl methacrylate, from KPX):
[4]SBS 0243 (Poly(styrene-butadiene-styrene), from Kraton);
[5]BR113 (polyacrylate, from Dianal America);
[6]MAA (Methacrylic acid, from Sinopharm);
[7]MBS2670 (polyacrylate-b-styrene-butyldiene, from DOW);
[8]VTB (vinyl-terminated polybutadiene, from Cray Valley);
[9]TPP (Triphenyl phosphite, from Sinopharm);
[10]DMPT (N,N-dimethyl-p-toluidine, from Sinopharm);
[11]BHT (Butylated hydroxytoluene, from Sinopharm);
[12]Karenz AOI-BP (isocyanate blocked by 3, 5 dimethyl pyrrazole, from Showa Denko K.K.);
[13]Karenz MOI-BP (isocyanate blocked by 3, 5 dimethyl pyrrazole, from Showa Denko K.K.);
[14]AOI (2-Acryloyloxyethyl Isocyanate from Showa Denko K.K.); and
[15]Wax (58#, from Sinopharm).

TABLE 2

Second part of the adhesive composition

| Components | Weight (%) | | | | | | |
|---|---|---|---|---|---|---|---|
| | Example 1 | Example 2 | Example 3 | Example 4 | Example 5 | Example 6 | Example 7 |
| BPO*[16] | 40 | 40 | 40 | 40 | 40 | 40 | 40 |
| Epoxy 828*[17] | 20.93 | 20.93 | 20.93 | 20.93 | 20.93 | 20.93 | 20.93 |
| DOA*[18] | 24 | 24 | | | 24 | 24 | 24 |
| MD 1652*[19] | 15 | 15 | 15 | 15 | 15 | 15 | 15 |
| Ultramarine*[20] blue | 0.07 | 0.07 | 0.07 | 0.07 | 0.07 | 0.07 | 0.07 |
| DOTP*[21] | | | 24 | 24 | | | |

*[16]BPO (Dibenzoyl peroxide, from Sinopharm);
*[17]Epoxy 828 (Difunctional bisphenol A/epichlorohydrin derived liquid epoxy resin, from Hexion Specialty Chemicals GmbH);
*[18]DOA (Dioctyl adipate, from Wengiang Chemical);
*[19]MD 1652 (Poly(styrene-ethylene-butylene-styrene), from Kraton);
*[20]Ultramarine blue (from Tianlan); and
*[21]DOTP (dioctyl terephthalate, from Sinopharm).

In Table 3, the shear strength of the adhesive composition samples to high surface energy substrate ($T_{high}$), and low surface energy substrate ($T_{low}$) is reported. The adhesive composition samples in Examples from 1 to 7 had good shear strength to both aluminum substrates and PC substrates.

In Table 3, the shear strength of the adhesive composition sample to low surface energy substrate after the cured adhesive composition is stored under rigorous condition ($T_r$) is also reported. The adhesive composition samples in Examples 1 to 5, had good shear strength to PC substrate. The adhesive samples in Example 3 and 4 had the highest $T_r$, and the adhesive sample in Example 5 had the lowest $R_d$. In Example 6, AOI was incorporated in the adhesive composition instead of the blocked isocyanate compound. The shear strength of the adhesive composition sample was poor, and $R_d$ was increased significantly. Similar results were observed for Example 7 when no isocyanate or blocked isocyanate compound was incorporated in the adhesive composition.

TABLE 3

Performance of the adhesive composition

| | Example 1 | Example 2 | Example 3 | Example 4 | Example 5 | Example 6 | Example 7 |
|---|---|---|---|---|---|---|---|
| $T_{high}$ (Mpa) | 14.9 | 14.5 | 15 | 14.5 | 14 | 13 | 13 |
| $T_{low}$ (Mpa) | 11 | 11 | 12 | 12 | 8 | 9.8 | 11 |
| $T_r$ (Mpa) | 6.8 | 7 | 9 | 9.5 | 7.5 | 4 | 4.7 |
| $R_d$ | 0.38 | 0.36 | 0.25 | 0.21 | 0.06 | 0.59 | 0.57 |

What is claimed is:

1. An adhesive composition comprising:
    (a) a first part comprising at least one ethylenically unsaturated monomer which does not contain an active hydrogen; and
    (b) a second part comprising at least one initiator,
    wherein the first part comprises 0% of methyl methacrylate by weight of the first part,
    wherein at least one blocked isocyanate compound having a de-blocking temperature of from 80° C. to 200° C. is presented in at least one of the first part, the second part or an optional separate third part,
    wherein the at least one ethylenically unsaturated monomer and the at least one blocked isocyanate compound are mixed in the first part in a temperature range from 25 to 80° C., and wherein the adhesive composition is curable without photocuring, wherein (a) the first part comprises tetrahydrofurfuryl methacrylate, ethylene glycol dimethacrylate, and isobornyl methacrylate.

2. The adhesive composition according to claim 1, wherein the weight ratio of the first part to the second part is from 10:1 to 5:1.

3. The adhesive composition according to claim 2, wherein the blocked isocyanate is isocyanate blocked by 3,5 dimethyl pyrrazole.

4. The adhesive composition according to claim 3, wherein the initiator is dibenzoyl peroxide.

5. The adhesive composition according to claim 1, wherein (a) the first part comprises tetrahydrofurfuryl methacrylate, ethylene glycol dimethacrylate, isobornyl methacrylate, and isocyanate blocked by 3,5 dimethyl pyrrazole; and (b) the second part comprises dibenzoyl peroxide.

6. The adhesive composition according to claim 1, wherein (a) the first part comprises tetrahydrofurfuryl acrylate present in about 31.7-32.7 wt. % of the first part, ethylene glycol dimethacrylate present in about 2.3-2.4 wt. % of the first part, isobornyl methacrylate present in about 26.9-27.9 wt. % of the first part, and isocyanate blocked by 3,5 dimethyl pyrrazole present in about 0.4-3.8 wt. % of the first part; and (b) the second part comprises dibenzoyl peroxide present in about 40 wt. % of the second part.

7. The adhesive composition according to claim 1, wherein the blocked isocyanate compound comprises at least one isocyanate group blocked by a pyrazole, triazole, oxime, phenol, malonate, or amine compound.

8. The adhesive composition according to claim 1, wherein the blocked isocyanate compound comprises at least one isocyanate group blocked by a pyrazole compound.

9. The adhesive composition according to claim 1, wherein at least one styrenic block copolymer, and/or at least one ethylenically unsaturated carboxylic acid, and/or at least one curing promoter, and/or at least one toughener, and/or at least one wax, and/or at least one polyacrylate polymer, and/or at least one inhibitor, and/or at least one epoxy resin, and/or at least one plasticizer, and/or at least one hydrogenated styrenic block copolymer, and/or at least one colorant is further presented in at least one of the first part, the second part or the optional separate third part.

10. The adhesive composition according to claim 1, comprising:
    (a) the first part comprising:
        (i) from 20 to 90% by weight of the first part of the at least one ethylenically unsaturated monomer;
        (ii) from 0.05 to 10% by weight of the first part of the at least one blocked isocyanate compound;
        (iii) from 0 to 45% by weight of the first part of at least one styrenic block copolymer;
        (iv) from 0 to 10% by weight of the first part of at least one curing promoter;
        (v) from 0 to 10% by weight of the first part of at least one ethylenically unsaturated carboxylic acid;
        (vi) from 0 to 40% by weight of the first part of at least one toughener;
        (vii) from 0 to 5% by weight of the first part of at least one inhibitor;
        (viii) from 0 to 5% by weight of the first part of at least one wax; and (ix) from 0 to 10% by weight of the first part of at least one polyacrylate polymer;

wherein the weight percentages of all components in the first part add up to 100%;

(b) the second part comprising:

(i) from 5 to 70% by weight of the second part of the at least one initiator;

(ii) from 0 to 50% by weight of the second part of at least one epoxy resin;

(iii) from 0 to 40% by weight of the second part of at least one plasticizer;

(iv) from 0 to 40% by weight of the second part of at least one hydrogenated styrenic block copolymer; and (v) from 0 to 1% by weight of the second part of at least one colorant;

wherein the weight percentages of all components in the second part add up to 100%.

11. A cured product of the adhesive composition according to claim 1.

12. An article bonded by the adhesive composition according to claim 1.

* * * * *